US012761818B2

(12) United States Patent
Huang

(10) Patent No.: US 12,761,818 B2
(45) Date of Patent: Oct. 13, 2026

(54) STORAGE DEVICES MANAGEMENT

(71) Applicant: Aivres Systems Inc., San Jose, CA (US)

(72) Inventor: Guan Long Huang, New Taipei City (TW)

(73) Assignee: Aivres Systems Inc., Fremont, CA (US)

( * ) Notice: Subject to any disclaimer, the term of this patent is extended or adjusted under 35 U.S.C. 154(b) by 54 days.

(21) Appl. No.: 19/007,136

(22) Filed: Dec. 31, 2024

(65) Prior Publication Data

US 2026/0186674 A1 Jul. 2, 2026

(51) Int. Cl.
*G06F 3/06* (2006.01)

(52) U.S. Cl.
CPC .......... *G06F 3/0629* (2013.01); *G06F 3/0604* (2013.01); *G06F 3/0679* (2013.01)

(58) Field of Classification Search
CPC .... G06F 3/0629; G06F 3/0604; G06F 3/0679; G06F 3/0619; G06F 3/0635; G06F 3/061; G06F 3/0634
USPC .................................................. 711/154, 103
See application file for complete search history.

(56) References Cited

U.S. PATENT DOCUMENTS

2015/0261718 A1* 9/2015 Campbell ........... G06F 13/4081 710/302
2018/0335958 A1* 11/2018 Wu ........................ G06F 3/0635
2021/0311767 A1* 10/2021 Oh ......................... G06F 3/0644

* cited by examiner

*Primary Examiner* — Hashem Farrokh
(74) *Attorney, Agent, or Firm* — Fish & Richardson P.C.

(57) ABSTRACT

The present disclosure relates to automatic configuration and management of storage devices. In an implementation, a computer-implemented method is provided. The method includes receiving product information of storage devices and determining a new configuration of a signal conditioning device based on the product information. The signal conditioning device is coupled to the storage devices and is configured to improve quality of an input/output (I/O) signal of the storage devices. The method further includes determining whether the new configuration is different from a present configuration of the signal conditioning device; and in response to determining that the new configuration is different from the present configuration, transmitting a control signal to the signal conditioning device. The control signal indicates the new configuration.

20 Claims, 3 Drawing Sheets

STORAGE DEVICES MANAGEMENT

BACKGROUND

Computing devices, such as servers, are widely used in a variety of fields. In areas such as artificial intelligence (AI) and big data, the need for computing is growing rapidly. To improve flexibility and computational efficiencies, some computing devices are configured to include different external devices within the same server chassis, making the computing devices suitable for various applications. For example, a computing device for AI applications can be configured to include one or more graphical processing units (GPUs). Storage servers can be configured to include one or more Non-Volatile Memory Express (NVMe) devices. The demand for high-speed data transfer in servers has become increasingly stringent, making using NVMe devices a growing industry trend. In addition to the advantage of providing high transfer speeds, NVMe devices can handle large volumes of data and can reduce the risk of data loss caused by track damage because they lack the mechanical rotors found in traditional hard drives.

SUMMARY

The present disclosure describes systems and techniques to automatically configure and manage storage devices.

In an implementation, a computer-implemented method is provided. The method includes receiving product information of storage devices and determining a new configuration of a signal conditioning device based on the product information. The signal conditioning device is coupled to the storage devices and is configured to improve quality of an input/output (I/O) signal of the storage devices. The method further includes determining whether the new configuration is different from a present configuration of the signal conditioning device; and in response to determining that the new configuration is different from the present configuration, transmitting a control signal to the signal conditioning device. The first control signal indicates the new configuration.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. The described techniques can simplify a system bill of materials (BOM) configurations (e.g., reducing the number of the system BOM configurations). The described methods and devices can be implemented by updating and maintaining firmware of existing hardware and interfaces, without the need to add new interface protocols, thereby reducing the production cost. In some implementations, functions such as thermal management, power control, EMI (Electromagnetic Interference) management, and stability management can be integrated into a single controller (e.g., a baseboard management controller (BMC)) or protocol. This approach can reduce the need for additional hardware circuits and minimize communication delays caused by different protocols, thereby creating a server environment better suited for the management of storage devices.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
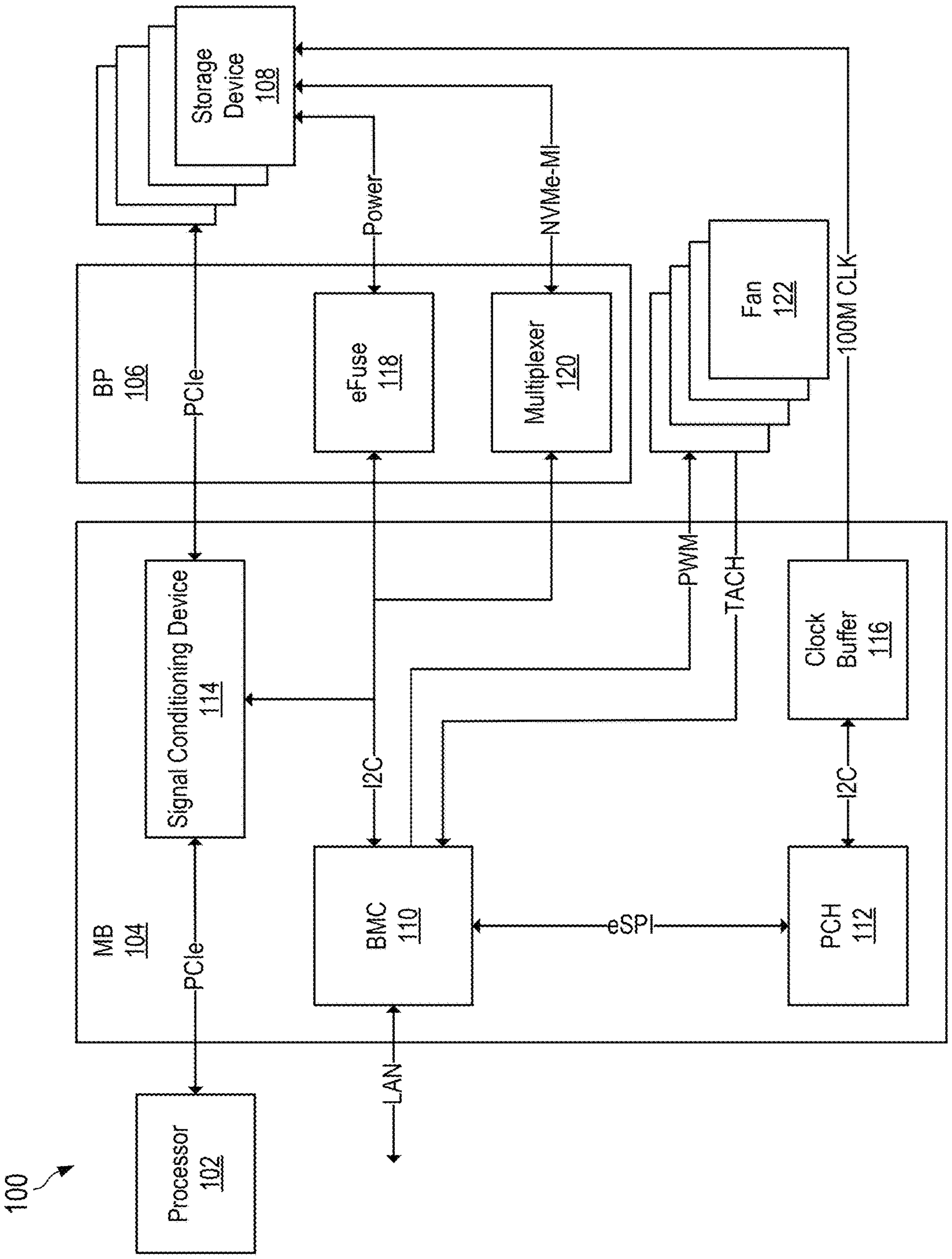
FIG. 1 is a block diagram of a computing device, according to an implementation of the present disclosure.

The following detailed description describes systems and techniques to automatically configure and manage storage devices and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Current technologies for configuring storage devices such as NVMe devices often involve dividing the system bill of materials (BOM) into different configurations. For example, the equalization (EQ) of Peripheral Component Interconnect Express (PCIe) retimers is provided in multiple firmware versions to support NVMe devices from different manufacturers. This approach can ensure optimal signal quality between a processor and the NVMe devices. Another aspect requiring additional configuration is the 100 MHz spread spectrum clock (SSC) used in the PCIe interface, which may vary depending on the designs of different manufacturers. During electromagnetic compatibility (EMC) testing, if the emitted electromagnetic interference is too severe, the SSC feature may need to be enabled to disperse the signal peak of the clock. The enabling of the SSC feature is typically achieved by binding the configuration to different basic input/output system (BIOS) versions. However, dividing the system BOM into different configurations as described above can increase the research and development (R&D) workload and can lead to increased maintenance and production costs. For example, to meet the shipping requirements for various product configurations, corresponding configuration work orders have to be created. Additionally, training for human operators needs to be performed at high standards, as the risk of errors such as incorrect firmware flashing or the omission of assembly components can be increased due to human judgment. Maintaining multiple configurations simultaneously imposes a significant burden on R&D teams. Different versions of firmware may have to be developed for each product configuration, which increases the likelihood of unexpected development bugs. Debugging these issues usually requires additional effort, which may potentially delay project timelines and introduce hidden risks.

The present disclosure relates to automatic configuration and management of storage devices. In one implementation, a computer-implemented method is provided. The method includes receiving product information of storage devices and determining a new configuration of a signal conditioning device based on the product information. The signal conditioning device is coupled to the one or more storage devices and is configured to improve quality of an input/output (I/O) signal of the storage devices. The method further includes determining whether the new configuration is different from a present configuration of the signal conditioning device; and in response to determining that the new configuration is different from the present configuration, transmitting a control signal to the signal conditioning device. The first control signal indicates the new configuration.

FIG. 1 is a block diagram of a computing device 100, according to an implementation of the present disclosure. The computing device 100 includes one or more processors 102. The one or more processors 102 can be one or more central processing units (CPUs), graphics processing units (GPUs), multi-core processors, microprocessors, quantum processors, or a combination of these. Although most of the descriptions below are using the example of CPUs, the described systems and techniques are applicable to other types of processors. The computing device 100 includes a motherboard (MB) 104. The MB 104 is the main circuit board that connects the computing device 100's internal and external components and allows them to communicate with each other. For example, the MB 104 can connect one or more processors, memory, graphics card, and other hardware. The computing device 100 further includes a backplane (BP) 106. The BP 106 is a circuit board that connects various modules, such as storage drives, power supplies, and expansion cards, to the MB 104.

The computing device 100 further includes one or more storage devices 108. The storage devices 108 can be coupled to the processor 102 through a storage interface provided by the BP 106 and the MB 104. For example, each storage device 108 can be a Non-Volatile Memory Express (NVMe) device. The NVMe device can use solid-state drives (SSDs) and NVMe storage interface and protocol. NVMe devices can offer faster data transfer speeds, lower latency, and better scalability compared to some other storage devices, making them suitable for high-demand applications such as data centers, gaming, and AI. In some implementations, the storage interface can be PCIe, which is a standardized high-speed interface used to connect various hardware components, such as graphics cards, SSDs, network cards, and other peripherals, to the MB 104.

The described techniques in the present disclosure allow the computing device 100 to automatically configure and manage the storage devices 108. In some implementations, the automatic configuration and management of the storage devices 108 can include configuring a signal conditioning device 114 of the MB 104 based on product information of the storage devices 108. As shown in FIG. 1, the signal conditioning device 114 can be coupled between the storage interface of the BP 106 and the storage interface of the MB 104. The signal conditioning device 114 can be configured to improve the quality of input/output (I/O) signals of the storage devices 108. For example, the signal conditioning device 114 can be used to amplify and clean up signals transmitted through the storage interface to ensure proper data transmission over extended distances or high-bandwidth connections. In some implementations, the signal conditioning device 114 can be a retimer (e.g., a PCIe retimer), which can perform equalization (EQ) by correcting signal degradation caused by interference, signal attenuation, or crosstalk from nearby channels. The retimer can also provide clock data recovery (CDR), which recovers and regenerates the original clock signal, thereby removing jitter (e.g., timing errors) introduced during transmission. In some other implementations, the signal conditioning device can be a redriver or a repeater, which amplifies the weakened signal to ensure that the signal remains strong enough to reach its destination.

The storage devices 108 of different models or from different manufacturers may have varying signal characteristics, such as impedance, signal strength, and noise levels. These differences can lead to signal degradation when transmitted between the processor 102 and the storage devices 108 (e.g., through PCIe connections). In addition, the design of the computing device 100 (e.g., the MB 104 or the BP 106) can introduce variances in data channels (e.g., from the storage devices 108 to the BP 106 and/or from the BP 106 to the MB 104). Storage devices from different manufacturers may react differently to these variances. The configuration of the signal conditioning device 114 may include equalization parameters (e.g., continuous time linear equalizer (CTLE) gain), pre-emphasis setting, de-emphasis setting, CDR parameters, etc. Customizing these parameters to match them to the signal transmission characteristics of the storage devices 108 can lead to improved data throughput and more reliable communication between the processor 102 and the storage devices 108.

The computing device 100 can configure the signal conditioning device 114, for example, by using a baseboard management controller (BMC) 110 of the MB 104. The BMC 110 is a microcontroller that provides out-of-band management of the computing device 100. In some implementations, the BMC 110 can provide administrators with remote access and control over hardware, for example, even when the computing device 100 is powered off or unresponsive. Typically, the BMC 110 can be accessible by the administrators via a dedicated Ethernet (or LAN) port or a shared network interface, thereby allowing secure remote connections. The BMC 110 can communicate with the signal conditioning device 114 through an $I^2C$ (Inter-Integrated Circuit, also called I2C) interface, which is a synchronous, multi-master, multi-slave, serial communication protocol used for communication between microcontrollers and peripheral devices.

In some implementations, the computing device 100 can determine (e.g., by using the BMC 110) a configuration (e.g., CTLE gain and CDR parameters) of the signal conditioning device 114 based on product information of the storage devices 108. For example, the product information can include a vendor identifier (ID), a model number, a serial number, a storage capacity, a drive type, or any combination thereof for each of the storage devices 108. In some implementations, the computing device 100 can obtain the product information of the storage devices 108 using the BMC 110. For example, as shown in FIG. 1, the BMC 110 can be coupled to the storage devices 108 through a multiplexer 120 of the BP 106. The multiplexer 120 can also be referred to as an input/output (I/O) expander, which enables the BMC 110 to communicate with a large number of devices. For example, the multiplexer 120 can be an I2C multiplexer that allows the BMC 110 to communicate with multiple devices that support the I2C interface. In some implementations, the storage devices 108 can be NVMe devices. In this case, the BMC 110 can communicate with the multiplexer 120 through the I2C interface, and the multiplexer 120 can communicate with the NVMe devices through a Non-Volatile Memory Express Management Interface (NVMe-MI), which is a specification that extends the NVMe protocol to enable out-of-band management of the NVMe devices. It is understood that the example of the multiplexer 120 is for illustration purpose and is not intended to be construed in a limiting sense. In practice, the BMC 110 may communicate directly with the storage devices 108 without using a multiplexer or an I/O expander.

In some implementations, the automatic configuration and management of the storage devices 108 can include enabling or disabling a spread spectrum clocking (SSC) feature based on product information of the storage devices 108. Storage interfaces (e.g., PCIe) can use a standard clock signal that operates at a fixed frequency (e.g., 100 MHz). In some instances, concentrating the clock signal at a fixed high frequency may increase electromagnetic interference (EMI) generated by the clock signal and make it difficult for an electronic device to meet regulatory standards (e.g., the Federal Communications Commission (FCC) requirements). Therefore, some high-speed interfaces such as PCIe and NVMe can support the SSC feature, which allows the frequency of the clock signal to be modulated over a small range, thereby reducing the EMI. However, not all storage devices support the SSC feature, and thus mixing SSC-enabled and non-SSC components can lead to clock synchronization problems. In addition, even if a storage device supports the SSC feature, it may not be necessary to always enable this feature. For example, in an environment where EMI is not a significant concern, enabling the SSC may cause compatibility issues or may impact the system performance due to clock jitter issues caused by the slight frequency variation. Therefore, before deploying the SSC, thorough testing to validate the performance such as clock stability and EMI compliance usually has to be performed.

In some implementations, the computing device 100 can determine (e.g., by using the BMC 110) whether to enable the SSC feature based on product information of the storage devices 108. For example, the BMC 110 can receive the product information (e.g., a vendor ID or a model number) of the storage devices 108. The BMC 110 can determine to enable the SSC feature when, for example, the storage devices 108 of this model have been tested and existing test results show that enabling the SSC feature can improve the system performance and reduce the EMI. In this case, the BMC 110 can control a clock buffer 116 of the MB 104 to generate a spread spectrum clock signal. In some implementations, as shown in FIG. 1, the BMC 110 can control the clock buffer 116 using a platform controller hub (PCH) 112 of the MB 104. The PCH 112 is configured to manage various I/O interfaces on the MB 104 and serve as an intermediary between the processor 102 and peripherals to route data from connected devices. In some implementations, the BMC 110 can communicate with the PCH 112 through an enhanced serial peripheral interface (eSPI), and the PCH 112 can communicate with the clock buffer 116 through the I2C interface.

In some implementations, the automatic configuration and management of the storage devices 108 can include dynamic power management based on a load condition of the storage devices 108. For example, the computing device 100 can use the BMC 110 to monitor a current load of the storage devices 108 (e.g., using feedback such as a value of a current from an eFuse 118 of the BP 106) and a current fan speed (e.g., represented by a tachometer signal) of one or more fans 122. The fans 122 can be installed in the computing device 100 and can be used to provide airflow to reduce the heat generated the storage devices 108 or other components of the computing device 100. When the storage devices 108 are undergoing heavy usage, the BMC 110 can detect an increase in the working current (e.g., for a threshold time period). In response, the BMC 110 can preemptively increase the fan speed (e.g., using pulse width modulation (PWM) control signals) to rapidly dissipate the heat generated by the storage devices 108. On the other hand, when the current drawn by storage devices 108 begins to decrease, the BMC 110 can reduce the fan speed to lower the overall power consumption of the computing device 100. This approach allows quicker response than some other methods (e.g., methods that rely on temperature sensors on the MB 104 or the BP 106).

In some other implementations, the dynamic power management for power saving or heat reduction can include turning off or throttling components that are not crucial for the operation of the storage devices 108. For example, when detecting that the storage devices 108 are undergoing heavy usage, the BMC 110 can shut down non-essential USB devices or GPUs (if the computing device 100 is not running graphically intensive applications) of the computing device 100 to prevent heat from building up.

Figure 2:
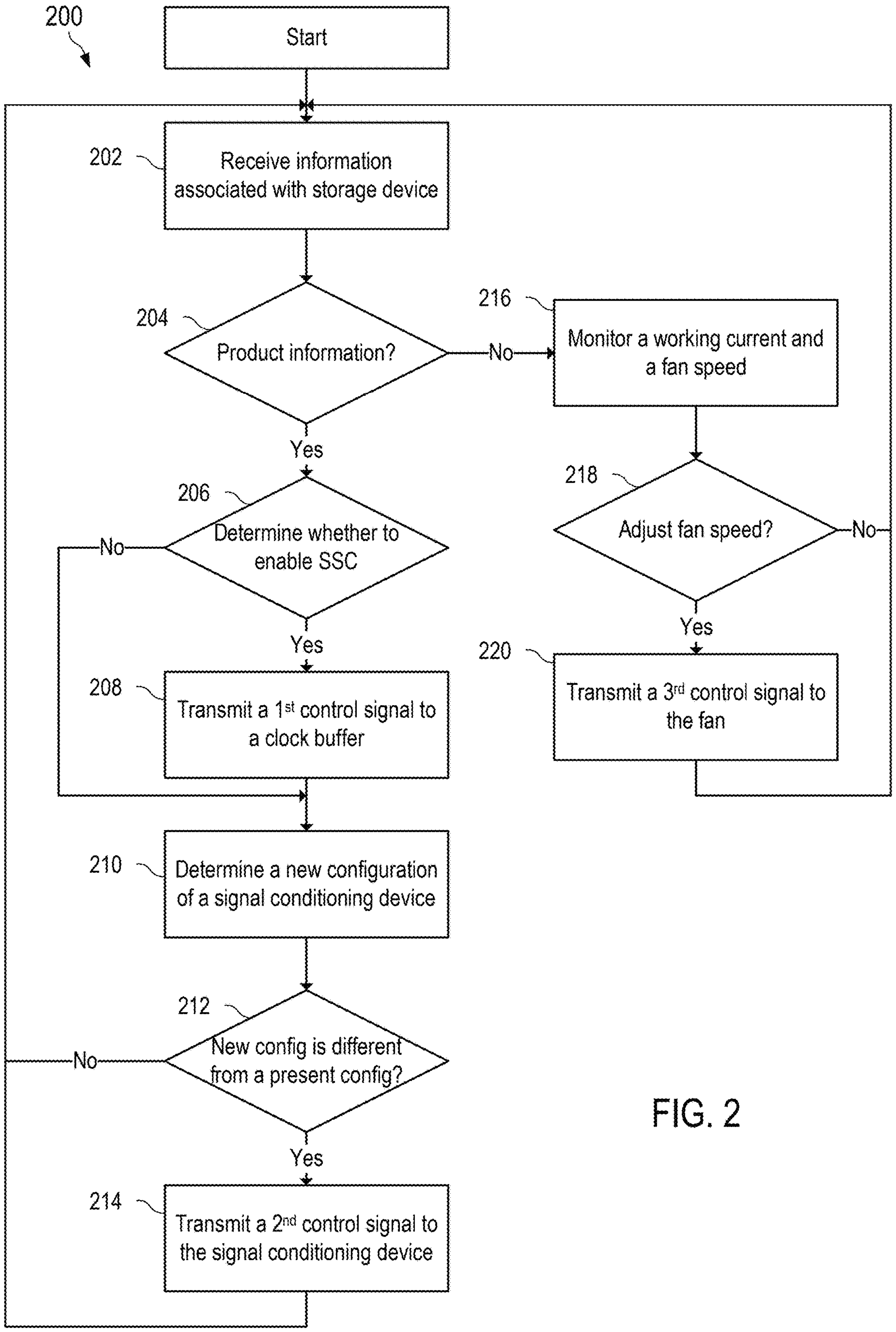
FIG. 2 is a flowchart of a computer-implemented method for automatic storage devices management, according to an implementation of the present disclosure.

FIG. 2 is a flowchart illustrating an example of a computer-implemented method 200 for automatic storage devices management, according to an implementation of the present disclosure. For clarity of presentation, the method 200 is performed by a computing device (e.g., the computing device 100 of FIG. 1), and the description that follows generally describes method 200 in the context of the other figures in this disclosure. However, it is understood that method 200 can be performed, for example, by any system, environment, software, and hardware, or a combination of systems, environments, software, and hardware, as appropriate. In some implementations, various steps of method 200 can be run in parallel, in combination, in loops, or in any order. In some implementations, the computing device can perform one or more, or all of the processes described in the method 200.

At 202, the computing device receives information associated with one or more storage devices (e.g., the one or more storage devices 108 of FIG. 1). The information associated with the storage devices can be product information of the storage devices. For example, the computing device can use a BMC (e.g., the BMC 110 of FIG. 1) to receive the product information from the storage devices. The BMC can receive the product information from the storage devices through a NVMe-MI interface. In some implementations, each of the storage devices can be a NVMe device. The product information can include at least one of a vendor ID, a model number, a serial number, a storage capacity, or a drive type for each storage device. In some implementations, the information associated with the storage devices can be a signal indicating a working current of the storage devices. For example, the computing device can use the BMC to receive a signal from an eFuse (e.g., the eFuse 118 of FIG. 1) coupled to the storage devices.

In some implementations, 202 can be triggered routinely at predetermined time intervals. For example, the storage devices or the eFuse can be configured to transmit the information associated with the storage devices periodically. Alternatively, 202 can be triggered by an event, such as when the computing device is powering up or when one or more new storage devices are installed in the computing device.

When the computing device receives (e.g., by using the BMC) the product information of the storage devices, the method 200 can proceed to 206. At 206, the computing device can determine (e.g., by using the BMC) whether to enable an SSC feature based on the product information. In some implementations, the BMC can make the determination based on the product information and existing test results. The test results can be stored in a memory of the BMC or any other memory that the BMC can access. For example, the BMC can determine to enable the SSC feature when the test results and the product information show that the storage devices support the SSC feature and that enabling the SSC feature can improve the performance of the storage devices and reduce the EMI. The method 200 proceeds to 208 when the computing device determines to enable the SSC feature; otherwise, the method proceeds to 210.

At 208, the computing device (e.g., by using the BMC) can transmit a first control signal to a clock buffer (e.g., the clock buffer 116 of FIG. 1) coupled to the storage devices. For example, the BMC can transmit a control signal to a PCH (e.g., the PCH 112 of FIG. 1) through an eSPI interface, and the control signal can cause the PCH to transmit another control signal to the clock buffer through an I2C interface. The first control signal can cause the clock buffer to generate a spread spectrum clock signal based on a reference clock signal.

At 210, the computing device can determine a new configuration of a signal conditioning device (e.g., the signal conditioning device 114 of FIG. 1) based on the product information. In some implementations, the signal conditioning device is a retimer coupled between a processor of the computing device and the storage devices. The new configuration can include equalization parameters of the retimer.

At 212, the computing device can determine whether the new configuration is different from a present configuration of the signal conditioning device. In some implementations, the computing device can determine the new configuration and the present configuration by using the BMC. For example, prior to 210, various configurations of the signal conditioning device for different storage devices (e.g., different models or different vendors) can be stored (e.g., in the form of a mapping table) in the memory of the BMC or another memory that the BMC has access to. The mapping table can list product information of different types of storage devices and corresponding configuration for the signal conditioning device. The BMC can look up the mapping table based on the product information to determine the new configuration. The BMC can obtain the present configuration from its own memory or from the signal conditioning device. The method 200 proceeds to 214 when the computing device determines that the new configuration of the storage devices is different from the present configuration of the storage devices. Otherwise, the method 200 proceeds to the beginning and reiterates when the computing device receives new information associated with the storage devices again.

At 214, the computing device transmits (e.g., by using the BMC) a second control signal to the signal conditioning device. The second control signal can indicate the new configuration. In some implementations, the second control signal can include specific parameters of the new configuration. Alternatively, the second control signal can include an index that is mapped to the new configuration based on a pre-configured mapping table, and the signal conditioning device can determine the new configuration based on the index and the mapping table. After 214, the method 200 can proceed to the beginning and reiterate when the computing device receives new information associated with the storage devices again.

When the computing device receives (e.g., by using the BMC) the signal indicating the working current of the storage devices from the eFuse, the method 200 can proceed to 216. At 216, the computing device can monitor the working current and speeds of one or more fans (e.g., the fans 122 of FIG. 1) of the computing device.

At 218, the BMC can determine whether to adjust the speeds of the fans. In some implementations, when the BMC detects an increase in the working current or that the working current is larger than a threshold (e.g., determined based on the current fan speeds) for a predetermined time period, the BMC can determine to increase the speeds of the fans. On the other hand, when the BMC detects a decrease in the working current or that the working current is smaller than a threshold (e.g., determined based on the current fan speeds) for a predetermined time period, the BMC can determine to decrease the speeds of the fans. The method 200 can proceed to 220 when the BMC determines to adjust the speeds of the fans. Otherwise, the BMC can determine to not adjust the speeds of the fans, and the method 200 can proceed to the beginning and reiterate when the computing device receives new information associated with the storage devices again.

At 220, the computing device can transmit (e.g., by using the BMC) a third control signal to the fans to control the speeds of the fans. The third control signal can be determined based on the working current and the current speeds of the fans. After 220, the method 200 can proceed to the beginning and reiterate when the computing device receives new information associated with the storage devices again.

While in the example of FIG. 2, some operations of the method 200 are performed by the BMC, it is understood that such descriptions are for illustration purpose and are not intended to be construed in a limiting sense. In practice, operations of the method 200 can be performed by any suitable controller or processor that can communicate with various components (e.g., the storage devices, the signal conditioning device, the eFuse, the clock buffer) of the computing device using any suitable interfaces. In some implementations, operations of the method 200 can be performed by different controllers. For example, a first controller can communicate with the storage devices, and a second controller can perform configuration of the signal conditioning device or configuration of the clock buffer. The first controller can communicate with the second controller. In another example, a first controller can communicate with the storage devices and perform configuration of the signal conditioning device, and a second controller can communicate with the storage devices and perform configuration of the clock buffer. Alternatively, in some other implementations, operations of the method 200 can be performed by the same controller. Integrating functions such as thermal management, power control, EMI (Electromagnetic Interference) management, and stability management into a single controller or protocol can reduce the need for additional hardware circuits and minimize communication delays caused by different protocols, thereby creating a server environment better suited for management of storage devices.

Figure 3:
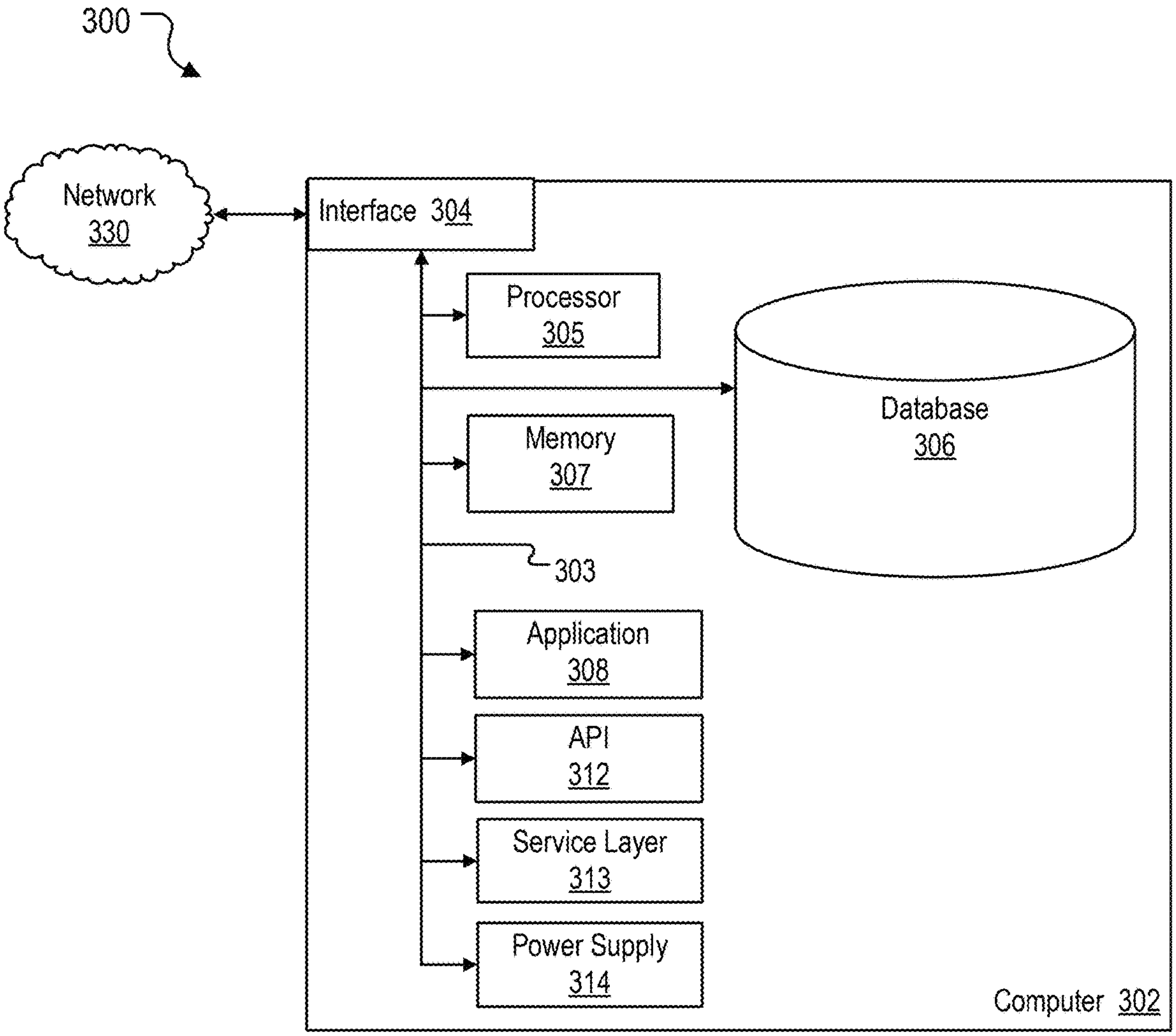
FIG. 3 is a block diagram illustrating a computer-implemented system used to provide computational functionalities associated with described algorithms, methods, functions, processes, flows, and procedures, according to an implementation of the present disclosure.

FIG. 3 is a block diagram illustrating an example of a computer-implemented System 300 used to provide computational functionalities associated with described algorithms, methods, functions, processes, flows, and procedures, according to an implementation of the present disclosure. In the illustrated implementation, computer-implemented system 300 includes a Computer 302 and a Network 330.

The illustrated Computer 302 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 302 can include an input device, such as a keypad, keyboard, or touch screen, or a combination of input devices that can accept user information, and an output device that conveys information associated with the operation of the Computer 302, including digital data, visual, audio, another type of information, or a combination of types of information, on a graphical-type user interface (UI) (or GUI) or other UI.

The Computer 302 can serve in a role in a distributed computing system as, for example, a client, network component, a server, or a database or another persistency, or a combination of roles for performing the subject matter described in the present disclosure. The illustrated Computer 302 is communicably coupled with a Network 330. In some implementations, one or more components of the Computer 302 can be configured to operate within an environment, or a combination of environments, including cloud-computing, local, or global.

At a high level, the Computer 302 is an electronic computing device operable to receive, transmit, process, store, or manage data and information associated with the described subject matter. According to some implementations, the Computer 302 can also include or be communicably coupled with a server, such as an application server, e-mail server, web server, caching server, or streaming data server, or a combination of servers.

The Computer 302 can receive requests over Network 330 (for example, from a client software application executing on another Computer 302) and respond to the received requests by processing the received requests using a software application or a combination of software applications. In addition, requests can also be sent to the Computer 302 from internal users (for example, from a command console or by another internal access method), external or third-parties, or other entities, individuals, systems, or computers.

Each of the components of the Computer 302 can communicate using a System Bus 303. In some implementations, any or all of the components of the Computer 302, including hardware, software, or a combination of hardware and software, can interface over the System Bus 303 using an application programming interface (API) 312, a Service Layer 313, or a combination of the API 312 and Service Layer 313. The API 312 can include specifications for routines, data structures, and object classes. The API 312 can be either computer-language independent or dependent and refer to a complete interface, a single function, or even a set of APIs. The Service Layer 313 provides software services to the Computer 302 or other components (whether illustrated or not) that are communicably coupled to the Computer 302. The functionality of the Computer 302 can be accessible for all service consumers using the Service Layer 313. Software services, such as those provided by the Service Layer 313, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 302, alternative implementations can illustrate the API 312 or the Service Layer 313 as stand-alone components in relation to other components of the Computer 302 or other components (whether illustrated or not) that are communicably coupled to the Computer 302. Moreover, any or all parts of the API 312 or the Service Layer 313 can be implemented as a child or a sub-module of another software module, enterprise application, or hardware module without departing from the scope of the present disclosure.

The Computer 302 includes an Interface 304. Although illustrated as a single Interface 304, two or more Interfaces 304 can be used according to particular needs, desires, or particular implementations of the Computer 302. The Interface 304 is used by the Computer 302 for communicating with another computing system (whether illustrated or not) that is communicatively linked to the Network 330 in a distributed environment. Generally, the Interface 304 is operable to communicate with the Network 330 and includes logic encoded in software, hardware, or a combination of software and hardware. More specifically, the Interface 304 can include software supporting one or more communication protocols associated with communications such that the Network 330 or hardware of Interface 304 is operable to communicate physical signals within and outside of the illustrated Computer 302.

The Computer 302 includes a Processor 305. Although illustrated as a single Processor 305, two or more Processors 305 can be used according to particular needs, desires, or particular implementations of the Computer 302. Generally, the Processor 305 executes instructions and manipulates data to perform the operations of the Computer 302 and any algorithms, methods, functions, processes, flows, and procedures as described in the present disclosure.

The Computer 302 also includes a Database 306 that can hold data for the Computer 302, another component communicatively linked to the Network 330 (whether illustrated or not), or a combination of the Computer 302 and another component. For example, Database 306 can be an in-memory or conventional database storing data consistent with the present disclosure. In some implementations, Database 306 can be a combination of two or more different database types (for example, a hybrid in-memory and conventional database) according to particular needs, desires, or particular implementations of the Computer 302 and the described functionality. Although illustrated as a single Database 306, two or more databases of similar or differing types can be used according to particular needs, desires, or particular implementations of the Computer 302 and the described functionality. While Database 306 is illustrated as an integral component of the Computer 302, in alternative implementations, Database 306 can be external to the Computer 302. The Database 306 can hold and operate on at least any data type mentioned or any data type consistent with this disclosure.

The Computer 302 also includes a Memory 307 that can hold data for the Computer 302, another component or components communicatively linked to the Network 330 (whether illustrated or not), or a combination of the Computer 302 and another component. Memory 307 can store any data consistent with the present disclosure. In some implementations, Memory 307 can be a combination of two or more different types of memory (for example, a combination of semiconductor and magnetic storage) according to particular needs, desires, or particular implementations of the Computer 302 and the described functionality. Although illustrated as a single Memory 307, two or more Memories 307 or similar or differing types can be used according to particular needs, desires, or particular implementations of the Computer 302 and the described functionality. While Memory 307 is illustrated as an integral component of the Computer 302, in alternative implementations, Memory 307 can be external to the Computer 302.

The Application 308 is an algorithmic software engine providing functionality according to particular needs, desires, or particular implementations of the Computer 302, particularly with respect to functionality described in the present disclosure. For example, Application 308 can serve as one or more components, modules, or applications. Further, although illustrated as a single Application 308, the Application 308 can be implemented as multiple Applications 308 on the Computer 302. In addition, although illustrated as integral to the Computer 302, in alternative implementations, the Application 308 can be external to the Computer 302.

The Computer 302 can also include a Power Supply 314. The Power Supply 314 can include a rechargeable or non-rechargeable battery that can be configured to be either user- or non-user-replaceable. In some implementations, the Power Supply 314 can include power-conversion or management circuits (including recharging, standby, or another power management functionality). In some implementations, the Power Supply 314 can include a power plug to allow the Computer 302 to be plugged into a wall socket or another power source to, for example, power the Computer 302 or recharge a rechargeable battery.

There can be any number of Computers 302 associated with, or external to, a computer system containing Computer 302, each Computer 302 communicating over Network 330. Further, the term "client," "user," or other appropriate terminology can be used interchangeably, as appropriate, without departing from the scope of the present disclosure. Moreover, the present disclosure contemplates that many users can use one Computer 302, or that one user can use multiple computers 302.

Described implementations of the subject matter can include one or more features, alone or in combination.

For example, in a first implementation, a computer-implemented method is provided. The method comprises: receiving product information of one or more storage devices; and determining a new configuration of a signal conditioning device based on the product information, where the signal conditioning device is coupled to the one or more storage devices and is configured to improve quality of an input/output (I/O) signal of the one or more storage devices. The method further comprises: determining whether the new configuration is different from a present configuration of the signal conditioning device; and in response to determining that the new configuration is different from the present configuration, transmitting a first control signal to the signal conditioning device, where the first control signal indicates the new configuration.

The foregoing and other described implementations can each, optionally, include one or more of the following features:

A first feature, combinable with any of the following features, wherein the signal conditioning device is a retimer coupled between a central processing unit (CPU) and the one or more storage devices, and the new configuration comprises equalization parameters of the retimer.

A second feature, combinable with any of the previous or following features, wherein the first control signal comprises the new configuration or an index that is mapped to the new configuration based on a pre-configured mapping table.

A third feature, combinable with any of the previous or following features, wherein the computer-implemented method further comprises: determining whether to enable a spread spectrum clocking (SSC) feature based on the product information; and in response to determining to enable the SSC feature, transmitting a second control signal to a clock buffer coupled to the one or more storage devices, wherein the second control signal causes the clock buffer to generate a spread spectrum clock signal based on a reference clock signal.

A fourth feature, combinable with any of the previous or following features, wherein the computer-implemented method further comprises: receiving a signal indicating a working current of the one or more storage devices; and transmitting a third control signal to control a speed of a fan based on the working current.

A fifth feature, combinable with any of the previous or following features, wherein the one or more storage devices are nonvolatile memory express (NVMe) devices.

A sixth feature, combinable with any of the previous or following features, wherein the product information comprises at least one of a vendor identifier (ID), a model number, a serial number, a storage capacity, or a drive type for each of the one or more storage devices.

A seventh feature, combinable with any of the previous or following features, wherein the receiving the product information of the one or more storage devices comprises: receiving, by a baseboard management controller (BMC), the product information from the one or more storage devices through a nonvolatile memory express management interface (NVMe-MI).

An eighth feature, combinable with any of the previous or following features, wherein the transmitting the second control signal to the clock buffer comprises: transmitting, by a baseboard management controller (BMC), a fourth control signal to a platform controller hub (PCH) through an enhanced serial peripheral interface (eSPI), wherein the fourth control signal causes the PCH to transmit the second control signal to the clock buffer through an inter-integrated circuit (I2C) interface.

In a second implementation, a computing device is provided. The computing device comprises: a central processing unit (CPU); one or more storage devices; and a controller configured to perform operations comprising: receiving product information of the one or more storage devices; determining a new configuration of a signal conditioning device based on the product information, where the signal conditioning device is coupled to the one or more storage devices and is configured to improve quality of an input/ output (I/O) signal of the one or more storage devices; determining whether the new configuration is different from a present configuration of the signal conditioning device; and in response to determining that the new configuration is different from the present configuration, transmitting a first control signal to the signal conditioning device, where the first control signal indicates the new configuration.

The foregoing and other described implementations can each, optionally, include one or more of the following features:

A first feature, combinable with any of the following features, wherein the signal conditioning device is a retimer coupled between a central processing unit (CPU) and the one or more storage devices, and the new configuration comprises equalization parameters of the retimer.

A second feature, combinable with any of the previous or following features, wherein the first control signal comprises the new configuration or an index that is mapped to the new configuration based on a pre-configured mapping table.

A third feature, combinable with any of the previous or following features, wherein the operations further comprise: determining whether to enable a spread spectrum clocking (SSC) feature based on the product information; and in response to determining to enable the SSC feature, transmitting a second control signal to a clock buffer coupled to the one or more storage devices, wherein the second control signal causes the clock buffer to generate a spread spectrum clock signal based on a reference clock signal.

A fourth feature, combinable with any of the previous or following features, wherein the operations further comprise: receiving a signal indicating a working current of the one or more storage devices; and transmitting a third control signal to control a speed of a fan based on the working current.

A fifth feature, combinable with any of the previous or following features, wherein the one or more storage devices are nonvolatile memory express (NVMe) devices.

A sixth feature, combinable with any of the previous or following features, wherein the product information comprises at least one of a vendor identifier (ID), a model number, a serial number, a storage capacity, or a drive type for each of the one or more storage devices.

A seventh feature, combinable with any of the previous or following features, wherein the receiving the product information of the one or more storage devices comprises: receiving, by a baseboard management controller (BMC), the product information from the one or more storage devices through a nonvolatile memory express management interface (NVMe-MI).

An eighth feature, combinable with any of the previous or following features, wherein the transmitting the second control signal to the clock buffer comprises: transmitting, by a baseboard management controller (BMC), a fourth control signal to a platform controller hub (PCH) through an enhanced serial peripheral interface (eSPI), wherein the fourth control signal causes the PCH to transmit the second control signal to the clock buffer through an inter-integrated circuit (I2C) interface.

In a third implementation, a non-transitory computer readable computer-readable medium is provided. The non-transitory computer readable computer-readable medium stores program instructions to perform operations comprising: receiving product information of one or more storage devices; determining a new configuration of a signal conditioning device based on the product information, where the signal conditioning device is coupled to the one or more storage devices and is configured to improve quality of an input/output (I/O) signal of the one or more storage devices; determining whether the new configuration is different from a present configuration of the signal conditioning device; and in response to determining that the new configuration is different from the present configuration, transmitting a first control signal to the signal conditioning device, where the first control signal indicates the new configuration.

The foregoing and other described implementations can each, optionally, include one or more of the following features:

A first feature, combinable with any of the following features, wherein the signal conditioning device is a retimer coupled between a central processing unit (CPU) and the one or more storage devices, and the new configuration comprises equalization parameters of the retimer.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:

receiving product information of one or more storage devices;

determining a new configuration of a signal conditioning device based on the product information, wherein the signal conditioning device is coupled to the one or more storage devices and is configured to improve quality of an input/output (I/O) signal of the one or more storage devices;

determining whether the new configuration is different from a present configuration of signal conditioning device; and in response to determining that the new configuration is different from the present configuration, transmitting a first control signal to the signal conditioning device, wherein the first control signal indicates the new configuration.

2. The computer-implemented method of claim 1, wherein the signal conditioning device is a retimer coupled between a central processing unit (CPU) and the one or more storage devices, and the new configuration comprises equalization parameters of the retimer.

3. The computer-implemented method of claim 1, wherein the first control signal comprises the new configuration or an index that is mapped to the new configuration based on a pre-configured mapping table.

4. The computer-implemented method of claim 1, further comprising:

determining whether to enable a spread spectrum clocking (SSC) feature based on the product information; and in response to determining to enable the SSC feature, transmitting a second control signal to a clock buffer coupled to the one or more storage devices, wherein the second control signal causes the clock buffer to generate a spread spectrum clock signal based on a reference clock signal.

5. The computer-implemented method of claim 4, wherein the transmitting the second control signal to the clock buffer comprises:

transmitting, by a baseboard management controller (BMC), a fourth control signal to a platform controller hub (PCH) through an enhanced serial peripheral interface (eSPI), wherein the fourth control signal causes the PCH to transmit the second control signal to the clock buffer through an inter-integrated circuit (I2C) interface.

6. The computer-implemented method of claim 1, further comprising:

receiving a signal indicating a working current of the one or more storage devices; and transmitting a third control signal to control a speed of a fan based on the working current.

7. The computer-implemented method of claim 1, wherein the one or more storage devices are nonvolatile memory express (NVMe) devices.

8. The computer-implemented method of claim 1, wherein the product information comprises at least one of a vendor identifier (ID), a model number, a serial number, a storage capacity, or a drive type for each of the one or more storage devices.

9. The computer-implemented method of claim 1, wherein the receiving the product information of the one or more storage devices comprises:

receiving, by a baseboard management controller (BMC), the product information from the one or more storage devices through a nonvolatile memory express management interface (NVMe-MI).

10. A computing device, comprising:

a central processing unit (CPU);

one or more storage devices; and a controller configured to perform operations comprising:

receiving product information of the one or more storage devices;

determining a new configuration of a signal conditioning device based on the product information, wherein the signal conditioning device is coupled to the one or more storage devices and is configured to improve quality of an input/output (I/O) signal of the one or more storage devices;

determining whether the new configuration is different from a present configuration of signal conditioning device; and in response to determining that the new configuration is different from the present configuration, transmitting a first control signal to the signal conditioning device, wherein the first control signal indicates the new configuration.

11. The computing device of claim 10, wherein the signal conditioning device is a retimer coupled between a central processing unit (CPU) and the one or more storage devices, and the new configuration comprises equalization parameters of the retimer.

12. The computing device of claim 10, wherein the first control signal comprises the new configuration or an index that is mapped to the new configuration based on a pre-configured mapping table.

13. The computing device of claim 10, wherein the operations further comprise:

determining whether to enable a spread spectrum clocking (SSC) feature based on the product information; and in response to determining to enable the SSC feature, transmitting a second control signal to a clock buffer coupled to the one or more storage devices, wherein the second control signal causes the clock buffer to generate a spread spectrum clock signal based on a reference clock signal.

14. The computing device of claim 13, wherein the transmitting the second control signal to the clock buffer comprises:

transmitting a fourth control signal to a platform controller hub (PCH) through an enhanced serial peripheral interface (eSPI), wherein the fourth control signal causes the PCH to transmit the second control signal to the clock buffer through an inter-integrated circuit (I2C) interface.

15. The computing device of claim 10, wherein the operations further comprise:

receiving a signal indicating a working current of the one or more storage devices; and transmitting a third control signal to control a speed of a fan based on the working current.

16. The computing device of claim 10, wherein the one or more storage devices are nonvolatile memory express (NVMe) devices.

17. The computing device of claim 10, wherein the product information comprises at least one of a vendor identifier (ID), a model number, a serial number, a storage capacity, or a drive type for each of the one or more storage devices.

18. The computing device of claim 10, wherein the receiving the product information of the one or more storage devices comprises:

Receiving the product information from the one or more storage devices through a nonvolatile memory express management interface (NVMe-MI).

19. A non-transitory computer readable computer-readable medium storing program instructions to perform operations comprising:

receiving product information of one or more storage devices;

determining a new configuration of a signal conditioning device based on the product information, wherein the signal conditioning device is coupled to the one or more storage devices and is configured to improve quality of an input/output (I/O) signal of the one or more storage devices;

determining whether the new configuration is different from a present configuration of signal conditioning device; and in response to determining that the new configuration is different from the present configuration, transmitting a first control signal to the signal conditioning device, wherein the first control signal indicates the new configuration.

20. The non-transitory computer readable computer-readable medium of claim 19, wherein the signal conditioning device is a retimer coupled between a central processing unit (CPU) and the one or more storage devices, and the new configuration comprises equalization parameters of the retimer.

* * * * *